June 11, 1946.  J. G. LOY  2,401,948
CONCEALED WIRING BLOCK
Filed May 12, 1944
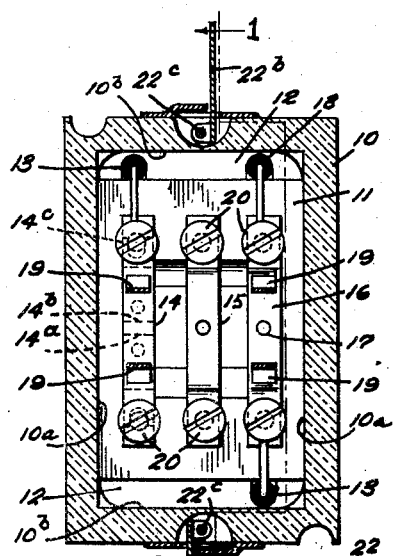
Fig. 2.
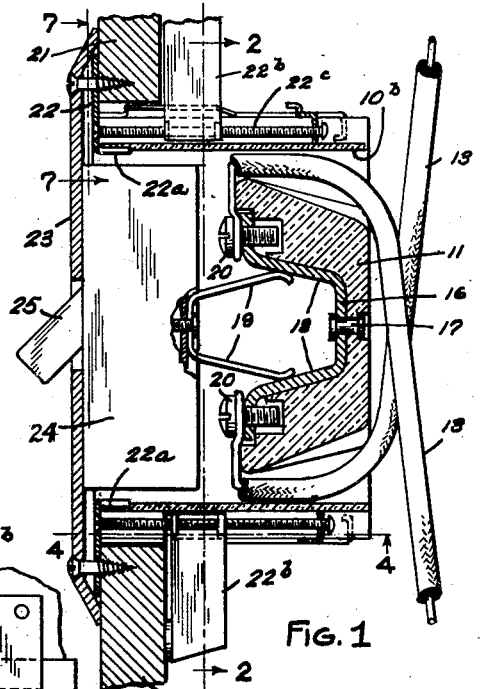
Fig. 7.
Fig. 1.
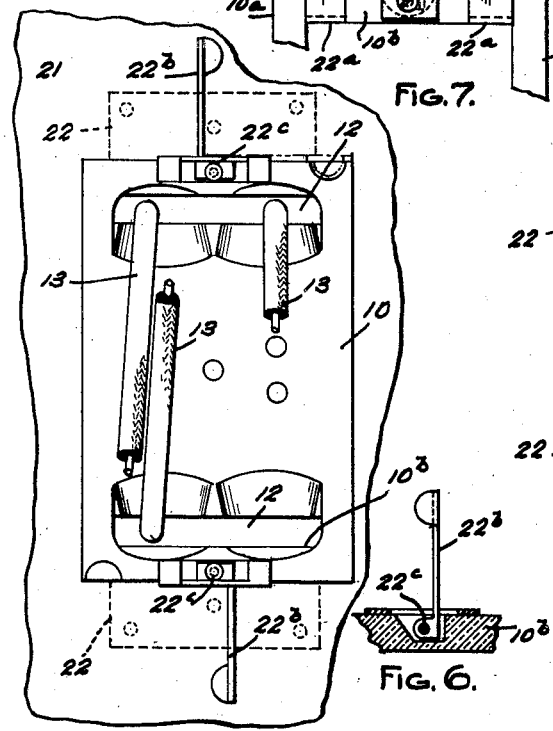
Fig. 6.
Fig. 3.
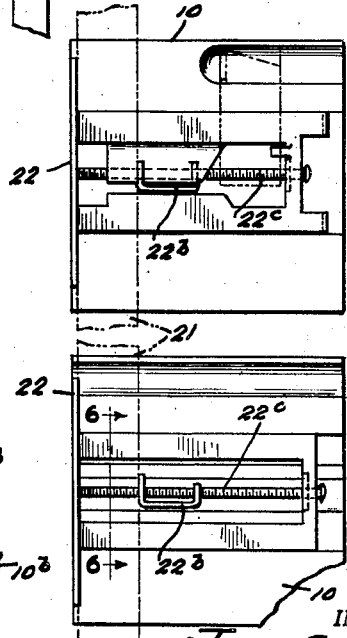
Fig. 4.
Fig. 5.
INVENTOR.
JOHN G. LOY
BY
Hyde and Meyer
ATTORNEYS.

Patented June 11, 1946

2,401,948

UNITED STATES PATENT OFFICE 2,401,948

CONCEALED WIRING BLOCK

John G. Loy, Findlay, Ohio, assignor to Porcelain Products, Inc., Findlay, Ohio, a corporation of Delaware Application May 12, 1944, Serial No. 535,377

8 Claims. (Cl. 174—53)

This invention relates to a block used in concealed wiring to perform the usual functions of an outlet box but having many advantages thereover.

An object of the present invention is to provide a wiring block concealed in a recess in a wall or the like easily accessible for making connections to the wiring system and providing permanent bus bars to which various electrical devices may be electrically connected by merely securing in place the cover means for the recess.

Another object of the invention is to provide a box-like structure, as above described, completely formed of insulating material, providing easy access to the binding posts of the bus bars and a laid-in arrangement for the connecting wires of the system, dispensing with the usual knockout portions of an outlet box while at the same time providing a fireproof construction which is perfectly safe.

Another object of the present invention is to provide a novel arrangement of wiping contacts between the fixed bus bars housed in the recess and the electrical device carried by the cover means for the recess.

Another object of the present invention is to provide a novel structure for carrying out the purposes of the last two paragraphs above, which at the same time provides a strong bridging structure for the wiring block.

Another object of the invention is to provide cover means including a block of insulating material which fits telescopically into the recess or box which is associated with the wiring block prior to the engagement of the fixed bus bars of the block by the contacts associated with the electrical device on the cover means so as to prevent any possible arc at the time of contact being communicated to the outside. This telescoping block also effectively shrouds the metal parts which are used to fasten the wiring block in place in its associated wall so that no conducting material is exposed on the inside of the box-like recess which is capable of conducting electricity to the outside of the box.

Other objects and advantages of the present invention will be apparent from accompanying drawing and description, and the essential features thereof will be summarized in the claims.

In the drawing:

Fig. 1 is a sectional view through my improved wiring block with the cover means in place, this view being taken along line 1—1 of Fig. 2;

Fig. 2 is a sectional view of the same taken along the line 2—2 of Fig. 1;

Fig. 3 is a bottom plan view of the device of Fig. 1;

Fig. 4 is an end view taken along the line 4—4 of Fig. 1 of the device of Figs. 1 to 3 showing one manner of securing my device to a wall;

Figs. 5 and 6 show a modified form of securing device; while

Fig. 7 is a fragmental view taken along the line 7—7 of Fig. 1.

The present invention provides a wiring block for use with the usual systems of concealed wiring, and, while it looks a good deal like the usual outlet box and performs many of the same functions, it has additional advantages which will be apparent as the description proceeds. I have shown the device as formed completely of insulating material such as porcelain, plastic, hard rubber, or the like, generally in the form of a box 10 having side walls 10a, end walls 10b, and a bottom wall in the form of a U-shaped bridge 11 which is integrally between side walls 10a but spaced from the end walls as indicated at 12 providing there a passageway for the introduction of the electrical conduits 13 which form part of the general wiring system in which the block is incorporated. Mounted on the upper or inside face of the bridge 11 are a plurality of parallel bus bars 14, 15, and 16, each bent in generally U-form to follow the contour of the bridge wall. These bars are secured to the bridge by grommets or rivets 17. The portions 18, providing the two legs of each U-shaped bus bar, are inclined upwardly and outwardly from the bottom of the bridge for the purpose of providing a wiping and firm engagement with the spring contacts 19 which are carried by the cover means. Each bus bar is provided with binding posts 20 at its opposite ends so that when the electrical conductors 13 are led in through the passageways 12, the wires may be bent substantially at right angles over the top wall of the bridge 11 and firmly secured to the binding posts.

If necessary or desirable, one of the bus bars, as for instance 14 (Fig. 2), may be in two portions 14a and 14b (shown in broken lines), each extending from one of the end binding posts 20 to a zone near the center of the bridge 11 where a slight space insulates the two bus bar portions from each other. The purpose of this split bus bar is for providing three-way switch connections as is known in this art. When this split bus bar is not desired, a jumper bar, essentially like the long bars 15 and 16, but having bifurcated ends 14c, is placed over the two short portions 14a and 14b and secured beneath the binding posts 20.

The box 10 is inserted through a suitable opening in a wall 21 and is secured thereto by any suitable means, for instance the means indicated here generally at 22, at each end of the box, this means including metal parts clamped over the top portion of the end wall 10b, part of the clamping means as shown at 22a extending to the inner face of the box near its open or front end. This particular securing means includes a clamping arm 22b operated by the screw 22c as set forth in my copending application, Serial Number 535,376, filed May 12, 1944 to which reference may be had for further particulars.

The cover means for closing the open front end of box 10 and thus concealing the recess in the wall 21 where the wiring block is secured comprises an escutcheon plate 23 and a block 24 either secured thereto or formed integrally therewith. This cover means may carry a switch as illustrated in the drawing having a throw-member 25, but this switch is shown purely for illustrative purposes as other electrical devices may be substituted therefore, such as lamp socket, convenience outlet, or the like. Whatever the device carried by the cover means, it will be supplied with electricity by means of spring contacts 19 of inverted U-form secured to the block 24 and electrically connected by means (not shown) with the electrical device incorporated in the cover means. There will be such spring contacts 19 overlying two or more of the bus bars in the wiring block. It will be obvious from Figs. 1 and 2 that each spring contact 19 will make wiping contact with its associated bus bar portion 18, and the spring contacts will be held in stressed condition by this wiping contact by the mere act of entering the block 24 telescopically in the open end of box 10 and by securing the cover means in place. At the time these two touching contacts make or break the electrical circuit, any arc or flame is substantially completely surrounded by the insulating material of the box 10 and the cover means 23 and 24. Note particularly in Fig. 1 that the metal portions 22a of the securing means which are generally of metal and extending to a point outside of box 10 are well-shrouded by block 24 from the electrically conducting parts housed in the box so that there is no chance of conducting electrical current outside of the box through the securing means. It should be noted that the inner ends of the legs of the U-formed bridge 11 where the binding posts 20 are provided are located sufficiently distant from the outside face of the bottom wall of the box so that with the usual electrical currents employed in household and industrial wiring, electricity or arcing flames could not be transmitted to any material lying at or upon the level of the bottom of the box on the outside. In the present device I prefer to make this distance of the order of one inch.

It should be noted in Figs. 1 and 2 that the binding posts 20 located substantially half way between the bottom and top faces of the box 10 are readily accessible for securing wires 13 and yet they are a sufficient distance from the outside of the box at the bottom as pointed out above to prevent fire damage there from arcing, and they are sufficiently distant from the front face of the box to permit the insulating block 24 to substantially close the open front face of the box before contacts 19 engage the bus bars and to shroud the metal parts 22a as previously described.

One of the advantages of my improved wiring block is that current from a conductor 13 may be carried completely through the wiring block as indicated at the bus bar 16 (Fig. 2) so that current may be fed not only to the device in block 24 but may be carried through the box 10 to a device located at some further point along one of the wires 13.

Another advantage of my device is that by removing the escutcheon plate 13 and connected block 24, a convenience outlet or other electrical device may be readily substituted for the switch having the throw 25 without disturbing any of the permanently connected parts in the box 10. In other words, the wires 13 are not directly connected to the device carried by the block 24, but, instead, electricity is fed to the device in the block 24 from permanently fixed bus bars through contacts 19 which are safely protected against fire hazard. If the wires 13 are brought into the device in crisscross fashion, as shown in Figs. 1 and 3, it is very easy to pull the box 10 forward out of the wall recess to permit easy attachment of the wires beneath the binding posts 20 after which the box 10 is pushed into the wall recess and secured in place without appreciable folding of excess wiring 13 back of the box 10.

It should be obvious to those skilled in the art that the above described device is an advance over the usual outlet box wherein wires 13 are brought into the box through knockout portions, sufficient wire being pulled through the box to permit attachment to an electrical device such as a switch, after which the switch with the wires attached is forced into the outlet box with the excess wire folded in back or alongside of the switch with its inconvenience and danger of short circuiting.

It will be obvious to those skilled in this art that the number of bus bars employed and the number of coacting contacts 19 will depend solely upon the electrical circuit employed and upon the electrical device carried by the block 24.

What I claim is:

1. An outlet box, comprising a chambered body formed of insulating material and provided with side and end walls and a bottom, means on the outside of the end walls for securing the box to the wall panel in which it lies, and a cross bridge at the bottom of the box connecting two of its side walls and provided interiorly of the box with a plurality of bus bars each having a binding post, said cross bridge being spaced from the end walls to provide an opening through the box bottom through which conductor wires may be led to said binding posts.

2. An outlet box, comprising a chambered body formed of insulating material and provided with side and end walls, means for securing the box to the wall panel in which it lies, a cross bridge at the bottom of the box connecting two of its side walls and provided interiorly of the box with a cavity, and a series of elongated bus bars disposed in parallel relation in said cavity.

3. An outlet box, comprising a chambered body formed of insulating material and provided with side and end walls, means for securing the box to the wall panel in which it lies, a cross bridge at the bottom of the box connecting two of its side walls and provided interiorly of the box with a cavity, and a series of elongated bus bars disposed in parallel relation in said cavity, the end walls of the cavity being inclined and the bus bars having corresponding diverging inclined portions to produce wiping engagement with the prongs of an electrical fitting inserted into the box.

4. An outlet box, comprising a chambered body formed of insulating material and provided with side and end walls and a bottom, means on the outside of the end walls for securing the box to the wall panel in which it lies, a cross bridge at the bottom of the box connecting two of its side walls, said bridge terminating short of the end walls leaving openings in the box bottom between the bridge and end walls through which conductor wires may be passed, and said cross bridge being of generally U-form presenting a cavity to the interior of the box, and current conducting bus bars mounted on said cross bridge within said cavity.

5. In combination, an outlet box adapted for insertion into an opening in a wall panel already secured in place and comprising a chambered body of insulating material provided with means for securing it to the panel and with a bottom wall having lead wire openings at opposite ends, bus bars on the inner surface of the box bottom, and an electrical fitting including an insulating block adapted for insertion into the chamber of the box through its top opening and provided with yielding contacts arranged to engage said bars when the block is inserted into the chamber, the inner surface of the box bottom being internally recessed to provide a cavity opening into said chamber, said bus bars being of generally U-form with opposed arms lying in said cavity and which are inclined to and diverge from each other to provide wiping engagement of said contacts with the bars within said cavity.

6. In a wiring block of insulating material having side walls, end walls and a bottom, and being open at the top, the combination of a bridge wall intermediate the end walls and spaced therefrom by an amount sufficient to permit the introduction of electrical conductors between said bridge wall and each end wall, said bridge wall being integral with said side walls, bus bars on the top face of said bridge wall having binding posts for connection with said conductors, and said bridge wall at the point of introduction of said conductors extending from the bottom of said block toward said open top a distance sufficient to prevent an arc at said bus bars reaching the level of said bottom.

7. The combination of claim 6 in which said bridge wall is of generally U-form with two legs inclined upwardly and outwardly from its central bottom portion providing inclined surfaces, said bus bars following said inclined surfaces, cover means for said open top, an electrical device carried by said cover means, and spring contact means carried by said cover means and electrically connected with said device, said contact means adapted to have wiping contact with said bus bars on said inclined surfaces by the act of placing said cover means in position to close said open top.

8. In a wiring device of insulating material of box-like form comprising side and end walls and a bottom and being open at the top, an electrical terminal inside said device and spaced below said top, cover means for closing said open top and including a block of insulating material adapted to enter telescopically between said walls, means on the outside of said walls for securing said device to a support and including a metal part clamped inside of one of said walls near said top, and said block being of sufficient length to extend over and beyond said metal part to shroud the same, whereby electricity cannot flow from said terminal to said metal part when said cover means is in place.

JOHN G. LOY.